United States Patent
Kishimoto et al.

(10) Patent No.: US 10,131,343 B2
(45) Date of Patent: Nov. 20, 2018

(54) HYBRID VEHICLE

(71) Applicant: TOYOTA JIDOSHA KABUSHIKI KAISHA, Toyota-shi, Aichi-ken (JP)

(72) Inventors: Takeshi Kishimoto, Nagakute (JP); Masaya Amano, Toyota (JP); Takashi Ando, Nisshin (JP); Yu Shimizu, Nagakute (JP); Yuki Hayakawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 87 days.

(21) Appl. No.: 15/278,228

(22) Filed: Sep. 28, 2016

(65) Prior Publication Data

US 2017/0096135 A1    Apr. 6, 2017

(30) Foreign Application Priority Data

Oct. 1, 2015    (JP) .................. 2015-196070

(51) Int. Cl.
*B60K 6/00* (2006.01)
*F02D 31/00* (2006.01)
(Continued)

(52) U.S. Cl.
CPC ............... *B60W 20/14* (2016.01); *B60K 6/26* (2013.01); *B60K 6/365* (2013.01); *B60K 6/445* (2013.01); *B60K 6/46* (2013.01); *B60L 11/1803* (2013.01); *B60W 10/06* (2013.01); *B60W 10/08* (2013.01); *B60W 10/18* (2013.01); *B60W 10/26* (2013.01); *B60W 20/50* (2013.01); *B60W 2050/0295* (2013.01); *B60W 2510/244* (2013.01); *B60W 2710/0644* (2013.01); *B60W 2710/08* (2013.01); *B60W 2710/18* (2013.01);

(Continued)

(58) Field of Classification Search
None
See application file for complete search history.

(56) References Cited

U.S. PATENT DOCUMENTS

2001/0048226 A1* 12/2001 Nada ...................... F02N 11/04
                                                                290/40 C
2009/0243554 A1   10/2009 Gu et al.

FOREIGN PATENT DOCUMENTS

| JP | 2009-234559 A | 10/2009 |
| JP | 2012-222895 A | 11/2012 |
| JP | 2013-203116   | 10/2013 |

\* cited by examiner

*Primary Examiner* — Adam D Tissot
(74) *Attorney, Agent, or Firm* — Finnegan, Henderson, Farabow, Garrett & Dunner, LLP

(57) ABSTRACT

A vehicle includes an engine, an MG (motor generator) an MG2, a planetary gear device mechanically coupled to the engine and MG1 and MG2, a battery, an inverter configured to perform a power conversion between the battery and MG1 and between the battery and MG2, and a controller. MG1 generates a counter-electromotive torque when rotated by the engine. During an inverter-less running control where the inverter is put into a gate shut-off state and the engine is driven to cause MG1 to generate the counter-electromotive torque, the controller decreases a engine target rotation speed Netag when an integrated value of battery charging current (deterioration evaluation value D) is greater than a predetermined value (threshold value D1) smaller than the engine target rotation speed Netag when the deterioration evaluation value D is equal to or smaller than the threshold value D1.

1 Claim, 7 Drawing Sheets

(51) Int. Cl.
| | |
|---|---|
| *B60K 1/00* | (2006.01) |
| *B60W 20/14* | (2016.01) |
| *B60K 6/26* | (2007.10) |
| *B60K 6/365* | (2007.10) |
| *B60K 6/46* | (2007.10) |
| *B60W 10/06* | (2006.01) |
| *B60W 10/08* | (2006.01) |
| *B60W 10/18* | (2012.01) |
| *B60W 10/26* | (2006.01) |
| *B60K 6/445* | (2007.10) |
| *B60L 11/18* | (2006.01) |
| *B60W 20/50* | (2016.01) |
| *B60W 50/029* | (2012.01) |

(52) U.S. Cl.
CPC .... *B60W 2710/242* (2013.01); *B60Y 2200/92* (2013.01); *B60Y 2300/18125* (2013.01); *B60Y 2300/43* (2013.01); *B60Y 2300/60* (2013.01); *B60Y 2300/91* (2013.01); *B60Y 2400/60* (2013.01); *B60Y 2400/61* (2013.01); *B60Y 2400/73* (2013.01); *B60Y 2400/81* (2013.01); *Y02T 10/6239* (2013.01); *Y02T 10/6286* (2013.01); *Y10S 903/906* (2013.01); *Y10S 903/91* (2013.01); *Y10S 903/93* (2013.01)

FIG.5 < INVERTER-LESS RUNNING >

HYBRID VEHICLE

This non-provisional application is based on Japanese Patent Application No. 2015-196070 filed on Oct. 1, 2015 with the Japan Patent Office, the entire contents of which are hereby incorporated by reference.

BACKGROUND OF THE INVENTION

Field of the Invention

The present invention relates to a hybrid vehicle capable of running by using at least one of the motive power from an engine and the motive power from a rotating electrical machine.

Description of the Background Art

Japanese Patent Laying-Open No. 2013-203116 discloses a hybrid vehicle which is provided with an engine, a first rotating electrical machine including a rotor provided with a permanent magnet, a second rotating electrical machine, a planetary gear mechanism, a battery, and an inverter configured to perform a power conversion between the converter and the first rotating electrical machine and between the converter and the second rotating electrical machine. The planetary gear mechanism includes a sun gear coupled to the first rotating electrical machine, a ring gear coupled to the second rotating electrical machine, and a carrier coupled to the engine. In this hybrid vehicle, if there occurs a malfunction such as the first rotating electrical machine and the second rotating electrical machine cannot be electrically driven by the inverter normally (hereinafter referred to as "inverter malfunction"), a control will be performed so that the inverter is brought into a gate shutoff state and the engine is controlled to drive the vehicle to run under a fail-safe mode.

SUMMARY OF THE INVENTION

As described in Japanese Patent Laying-Open No. 2013-203116, when a malfunction occurs, the inverter is brought into agate shut-off state and the engine is controlled to drive the vehicle to run under a fail-safe mode, this kind of control will be referred to as "inverter-less running control" in the present specification.

In the inverter-less running control in, while the inverter is being brought into the gate shut-off state, the first rotating electrical machine is dynamically (mechanically) rotated by the rotational force from the engine, and thereby generates a counter-electromotive power. Accordingly, the first rotating electrical machine generates a counter-electromotive torque (braking torque) which acts in a direction to prevent the first rotating electrical machine from rotating. The counter-electromotive torque will take a higher value as the rotation speed of the first rotating electrical machine is higher. Due to the action of the counter-electromotive torque from the first rotating electrical machine on the sun gear, a drive torque is generated in the ring gear acting in a positive direction as a reaction force against the counter-electromotive, torque from the first rotating electrical machine. Owing to the drive torque, the fail-safe mode is achieved.

However, it is concerned that the battery may be deteriorated when it is continuously charged during the inverter-less running control. In other words, during the inverter-less running control, the battery is continuously charged by the counter-electromotive power generated by the first rotating electric machine. When the battery charging current is large and the battery is continuously charged by the large current (high-rate charging), the battery may be deteriorated irreversibly.

The present invention has been accomplished in view of the aforementioned problems, and it is therefore an object of the present invention to provide a hybrid vehicle capable of suppressing battery deterioration during an inverter-less running control.

The hybrid vehicle according to the present disclosure includes an engine, a first rotating electrical machine including a rotor provided with a permanent magnet, an output shaft coupled to drive wheels, a planetary gear device mechanically coupled to the engine, the first rotating electrical machine and the output shaft, and configured to transmit torque among the engine, the first rotating electrical machine and the output shaft, a second rotating electrical machine coupled to the output shaft, a battery, an inverter configured to perform a power conversion between the battery and the first rotating electrical machine and between the battery and the second rotating electrical machine, and a controller configured to perform an inverter-less running control when at least one of the first rotating electrical machine and the second rotating electrical machine is not normally driven by the inverter. The inverter-less running control is such a control that the inverter is brought into a gate shut-off state, and the engine is driven to cause the first rotating electrical machine to generate a braking torque due to a counter-electromotive voltage generated by the first rotating electrical machine, and thereby the vehicle is caused to run with a torque which acts on the output shaft as a counterforce of the braking torque. During the inverter-less running control, the controller is configured to control a rotation speed of the engine to be a first engine rotation speed smaller than a second engine rotation speed, the first engine rotation speed being the rotation speed of the engine when an integrated value of battery charging current is greater than a predetermined value, and the second engine rotation speed being the rotation speed of the engine when the integrated value of battery charging current is equal to or less than the predetermined value.

According to the present disclosure, during the inverter-less running control, when the integrated value of the battery charging current is greater than a predetermined value, since it is concerned that the battery is continuously charged by a large current (high-rate charging) and thereby the battery may be deteriorated, the rotation speed of the engine is reduced, and thereby, the counter-electromotive power generated by the first rotating electric machine, namely the charging power of the battery is reduced. As a result, it is possible to suppress the battery deterioration during the inverter-less running control.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
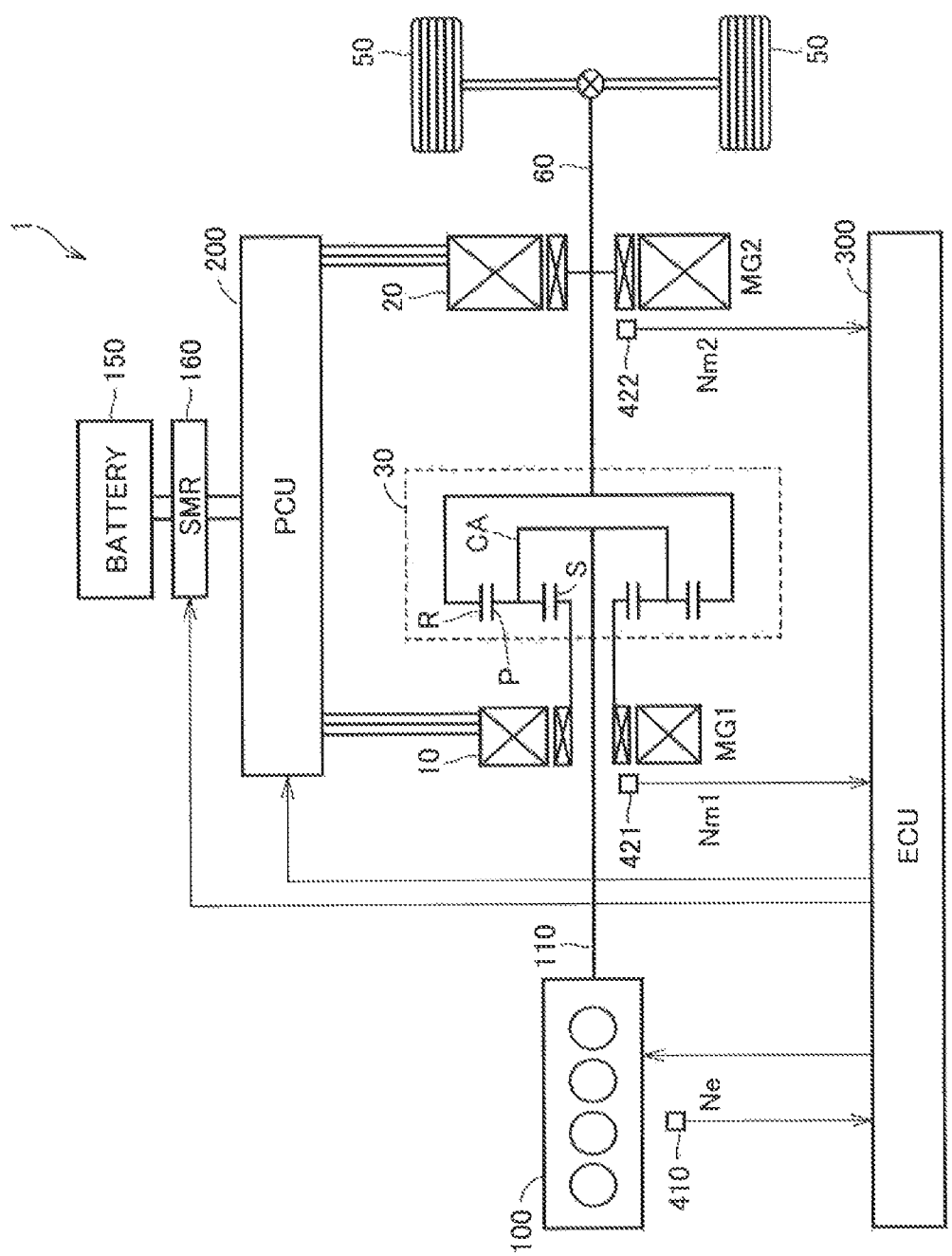
FIG. 1 is a block diagram schematically illustrating the overall configuration of a vehicle.

Hereinafter, embodiments of the present invention will be described in detail with reference to the accompanying drawings. It should be noted that the same or equivalent portions in the drawings will be denoted by the same reference signs, and the description thereof will not be repeated.

<Overall Configuration of Vehicle>

FIG. 1 is a block diagram schematically illustrating the overall configuration of a vehicle 1 according to the present embodiment. Vehicle 1 includes an engine 100, a motor generator (first rotating electrical machine) 10, a motor generator (second rotating electrical machine) 20, a planetary gear mechanism 30, drive wheels 50, an output shaft 60 coupled to drive wheels 50, a battery 150, a system main relay (SMR) 160, a power control unit (PCU) 200, and an electronic control unit (ECU) 300.

Vehicle 1 is a hybrid vehicle that runs by using at least one of the motive power from engine 100 and the motive power from motor generator 20. In normal running which will be described later, vehicle 1 can switch the running mode between an electrical vehicle running mode in which the vehicle is driven to run by using the motive power from motor generator 20 without using the motive power from engine 100 (hereinafter referred to as "EV running") and a hybrid vehicle running mode in which the vehicle is driven to run by using both the motive power from engine 100 and the motive power from motor generator 20 (hereinafter referred to as "HV running").

Engine 100 is an internal combustion engine such as a gasoline engine or a diesel engine. Engine 100 is configured to generate the motive power for driving vehicle 1 to run in response to a control signal from ECU 300. The motive power generated by engine 100 is output to planetary gear mechanism 30.

Engine 100 is provided with an engine rotation speed sensor 410. Engine rotation speed sensor 410 is configured to detect a rotation speed (engine rotation speed) Ne of engine 100, and output a signal indicating the detection result to ECU 100.

Each of motor generators 10 and 20 is a three-phase AC permanent magnet synchronous motor. At the time of initiating engine 100, motor generator 10 can rotate a crankshaft 110 of engine 100 by using the electrical power from battery 150. Motor generator 10 can also generate AC power by using the motive power from engine 100. The AC power generated by motor generator 10 is converted into DC power by PCU 200 and charged into battery 150. If necessary, the AC power generated by motor generator 10 may be supplied to motor generator 20.

The rotor of motor generator 20 is coupled to output shaft 60. Motor generator 20 can rotate output shaft 60 by using the electrical power supplied from at least one of battery 150 and motor generator 10. Motor generator 20 can also generate AC power through regenerative braking. The AC power generated by motor generator 20 is converted into DC power by PCU 200 and charged into battery 150.

Motor generator 10 is provided with a resolver 421. Resolver 421 is configured to detect a rotation speed (MG1 rotation speed) Nm1 of motor generator 10, and output a signal indicating the detection result to ECU 300. Similarly, motor generator 20 is provided with a resolver 422. Resolver 422 is configured to detect a rotation speed (MG2 rotation speed) Nm2 of motor generator 20, and output a signal indicating the detection result to ECU 300.

Planetary gear mechanism 30 is mechanically coupled to engine 100, motor generator 10 and output shaft 60, and is configured to transmit torque among engine 100, motor generator 10 and output shaft 60. Specifically, planetary gear mechanism 30 includes, as rotating elements, a sun gear S coupled to the rotor of motor generator 10, a ring gear R coupled to output shaft 60, a carrier CA coupled to crankshaft 110 of engine 100, and a pinion gear P meshing with sun gear S and ring gear R. Carrier CA is configured to hold pinion gear P in such a manner that pinion gear P is capable of rotating and revolving.

Battery 150 is a rechargeable secondary battery such as a lithium ion secondary battery or a nickel-hydrogen secondary battery.

SMR 160 is connected in series between battery 150 and PCU 200 via a power line, SMR 160 is configured to switch between a conducted state in which battery 150 and PCU 200 are conducted to each other and a disconnected state in which battery 150 and PCU 200 are disconnected from each other in response to a control signal from ECU 300.

PCU 200 boosts the voltage of the DC power supplied from battery 150, converts the DC power with a boosted voltage into AC power and supplies the AC power to motor generator 10 and motor generator 20. Further, PCU 200 converts the AC power generated by motor generator 10 and motor generator 20 into DC power and supplies the DC power to battery 150. The configuration of PCU 200 will be described in detail with reference to FIG. 2.

ECU 300 is provided with a central processing unit (CPU), a memory, an input buffer and an output buffer or the like (none of them is illustrated in the drawings). ECU 300 controls various devices such that vehicle 1 runs in a desired running state in accordance with a signal from each of the sensors and instruments as well as a map and a program stored in the memory. Note that the various controls are not limited to be processed by software, and they may be processed by dedicated hardware (such as an electronic circuitry).

<Configuration of Electrical System and ECU>

Figure 2:
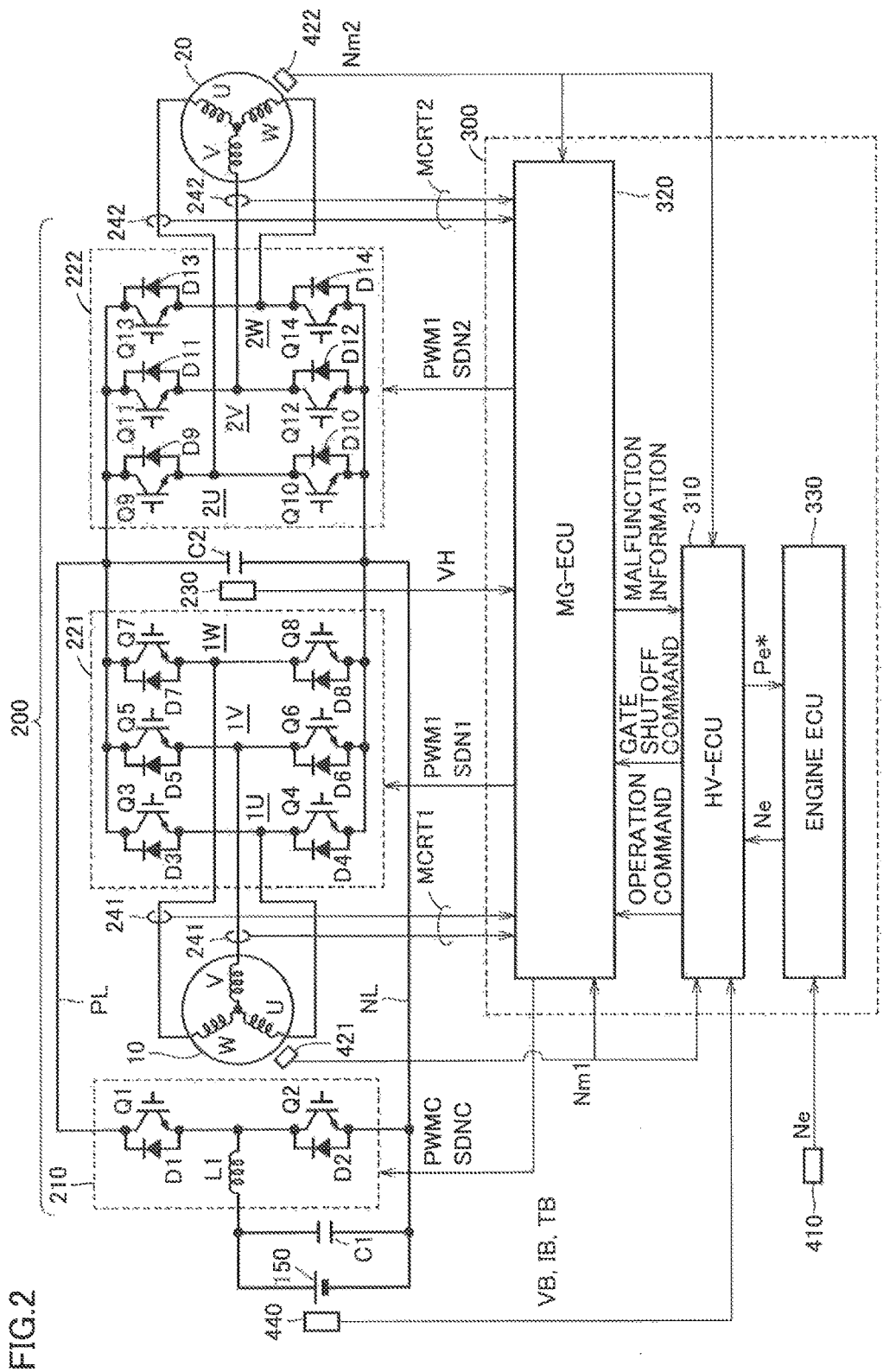
FIG. 2 is a circuit block diagram illustrating the configuration of an electrical system and an ECU of the vehicle.

FIG. 2 is a circuit block diagram for illustrating the configuration of an electrical system and ECU 300 of vehicle 1. PCU 200 includes a capacitor C1, a converter 210, a capacitor C2, inverters 221 and 222, a voltage sensor 230, and current sensors 241 and 242, EC U300 includes an HV-ECU 310, an MG-ECU 320, and an engine ECU 330.

Battery 150 is provided with a monitor unit 440. Monitor unit 440 is configured to detect a voltage (battery voltage) VB of battery 150, a current (battery charging current) 113 supplied to battery 150, a temperature (battery temperature) TB of battery 150, and output a signal indicating the respective detection result to MG-ECU 320. Capacitor is configured to smooth battery voltage VB and supply the smoothed voltage to converter 210.

Converter 210 is configured to boost battery voltage VB in response to a control signal from MG-ECU 320, and supply the boosted voltage to power lines PL and NL. In addition, converter 210 is also configured to step down the voltage of the DC power supplied from one or both of inverters 221 and 222 to power lines PL and NL in response to a control signal from MG-ECU 320 so as to charge battery 150.

More specifically, converter 210 includes a reactor L1, switching elements Q1 and Q2, and diodes D1 and D2. Each of switching elements Q1 and Q2 and switching elements Q3 to Q14 which will be described hereinafter is for example an insulated gate bipolar transistor (IGBT). Switching elements Q1 and Q2 are connected in series between power line PL and power line NL. Diode D1 is connected between a collector and an emitter of switching element Q1 in inverse parallel to switching element Q1, and diode D2 is connected between a collector and an emitter of switching element Q2 in inverse parallel to switching element Q2. One end of reactor L1 is connected to the high potential side of battery 150, and the other end of reactor L1 is connected to an intermediate point between switching elements Q1 and Q2 (i.e., the joining point between the emitter of switching element Q1 and the collector of switching element Q2).

Capacitor C2 is connected between power line PL and power line NL. Capacitor C2 is configured to smooth a DC voltage supplied from converter 210 and supply the smoothed voltage to inverters 221 and 222.

Voltage sensor 230 is configured to detect the voltage across capacitor C2, namely the output voltage VH (hereinafter referred to as "system voltage") of converter 210, and output a signal indicating the detection result to MG-ECU 320.

As system voltage VH is supplied to inverter 221, inverter 221 converts the DC voltage into an AC voltage in response to a control signal from MG-ECU 320 so as to drive motor generator 10. Thus, motor generator 10 is driven to generate a torque specified by a torque command value TR1.

More specifically, inverter 221 includes a U-phase arm 1U, a V-phase arm 1V and a W-phase arm 1W. The 3 phase arms are connected in parallel to each other between power line PL and power line NL. U-phase arm 1U includes a switching element Q3 and a switching element Q4 which are connected in series to each other. V-phase arm 1V includes a switching element Q5 and a switching element Q6 which are connected in series to each other. W-phase arm 1W includes a switching element Q7 and a switching element Q8 which are connected in series to each other. Diode D3 is connected between a collector and an emitter of switching element Q3 in inverse parallel to switching element Q3. In the same way, diodes D4 to D8 are each connected between the collector and the emitter of each of switching elements Q4 to Q8 in inverse parallel to the corresponding switching element, respectively.

Inverter 222 includes phase arms 2U to 2W, switching elements Q9 to Q14, and diodes D9 to D14. Since the configuration of inverter 222 is substantially equivalent to that of inverter 221, the description thereof will not be repeated.

Current sensor 241 is configured to detect a current (motor current) MCRT1 flowing through motor generator 10, and output a signal indicating the detection result to MG-ECU 320. Current sensor 242 is configured to detect a current (motor current) MCRT2 flowing through motor generator 20, and output a signal indicating the detection result to MG-ECU 320.

HV-ECU 310 is configured to generate an operation command for controlling motor generators 10 and 20, and output the operation command to MG-ECU 320. The operation command for motor generators 10 and 20 may include an operation permitting command and/or an operation prohibiting command (command for shutting off gates to inverters 221 and 222) for controlling each of motor generators 10 and 20, a torque command value TR1 for controlling motor generator 10, a torque command value TR2 for controlling motor generator 20, a command value for controlling MG1 rotation speed Nm1, a command value for controlling MG2 rotation speed Nm2 and the like.

HV-ECU 310 is further configured to set a target output voltage (hereinafter referred to as "system target voltage") VHtag for converter 210, and output a signal indicating the value of the target output voltage to MG-ECU 320. ITV-ECU 310 is further configured to determine an engine required power Pe*, and output a signal indicating the value of the engine required power to engine ECU 330.

MG-ECU 320 receives the operation command and system target voltage VHtag for motor generators 10 and 20 from HV-ECU 310. Furthermore, MG-ECU 320 receives signals from the respective sensors.

MG-ECU 320, based on the operation command and system target voltage VHtag as well as a variety of signals, controls converter 210 so as to make system voltage VH equal to system target voltage VHtag. More specifically, MG-ECU 320, based on system target voltage VHtag, battery voltage VB and system voltage VH, generates a PWM-type (Pulse Width Modulation) control signal PWMC so as to cause each of switching elements Q1 and Q2 to perform switching operations, and outputs the signal to converter 210. On the other hand, MG-ECU 320, when receiving a gate shut-off command of converter 210 from HV-ECU 310, generates a gate shut-off signal SDNC for shutting off respective switching elements Q1 and Q2, and outputs the signal to converter 210.

In addition, MG-ECU 320 controls inverters 221 and 222 such that motor generators 10 and 20 operate in accordance with an operation command received from HV-ECU 310. Since inverters 221 and 222 are controlled in the same manner, the control on inverter 221 will be described only. When receiving an operation permission command for motor generator 10 from HV-ECU 310, MG-ECU 320, based on system voltage VH, motor current MCRT1 and torque command value TR1, generates a PWM-type control signal PWM1 so as to cause each of switching elements Q3 to Q8 to perform switching operations, and outputs the signal to inverter 221. On the other hand, MG-ECU 320, when receiving a gate shut-off command of inverter 221 from HV-ECU 310, generates a gate shut-off signal SDN1 for shutting off respective switching elements Q3 to Q8, and outputs the signal to inverter 221.

Furthermore, MG-ECU 320 detects malfunction in motor generators 10 and 20. The malfunction information detected by MG-ECU 320 is output to MV-ECU 310. HV-ECU 310 is configured to be capable of reflecting the malfunction information to the operation command issued to respective motor generators 10 and 20.

Engine ECU 330 receives engine rotation speed Ne from engine rotation speed sensor 410, and outputs the value to HV-ECU 330. Engine ECU 330 controls the fuel injection, the ignition timing, the valve timing and the like of engine 100 so as to make engine 100 operate under an operating point (engine target rotation speed Netag and engine target torque Tetag) determined based on engine required power Pe* determined by HV-ECU 310.

In the example illustrated in FIG. 2, ECU 300 is divided into three units (HV-ECU 310, MG-ECU 320 and engine ECU 330), and however, ECU 300 may be divided into four units or more.

Additionally, HV-ECU 310, MG-ECU 320 and engine ECU 330 may be integrated into one unit. Hereinafter, HV-ECU 310, MG-ECU 320 and engine ECU 330 will be described as ECU 300 representatively.

<Normal Running and Inverter-less Running>

ECU 300 can control vehicle 1 to run under either normal mode or fail-safe mode.

The normal mode refers to such a mode that vehicle 1 is driven to run while switching as required between the EV running and the HV running which are described in the above. In other words, the normal mode allows the electrical driving of motor generators 10 and 20 by respective inverters 221 and 222. Hereinafter, the running of vehicle 1 under the normal mode is simply described as "normal running".

The fail-safe mode refers to such a mode that when an malfunction has occurred and thereby the electrical driving of motor generators 10 and 20 by respective inverters 221 and 222 cannot be performed normally (hereinafter the malfunction is referred to as "inverter malfunction"), vehicle 1 is driven to perform the fail-safe running by engine 100 while shutting off the respective gates of inverters 221 and 222. In other words, the fail-safe mode does not allow the electrical driving of motor generators 10 and 20 by respective inverters 221 and 222. The inverter malfunction may include sensor malfunction in resolvers 421 and 422 and current sensors 241 and 242 or the like, and communication malfunction between MG-ECU 320 and HV-ECU 310, for example. Hereinafter, the running in the fail-safe mode will be described as "inverter-less running", and the control for performing the inverter-less running will be described as "inverter-less running control".

Figure 3:
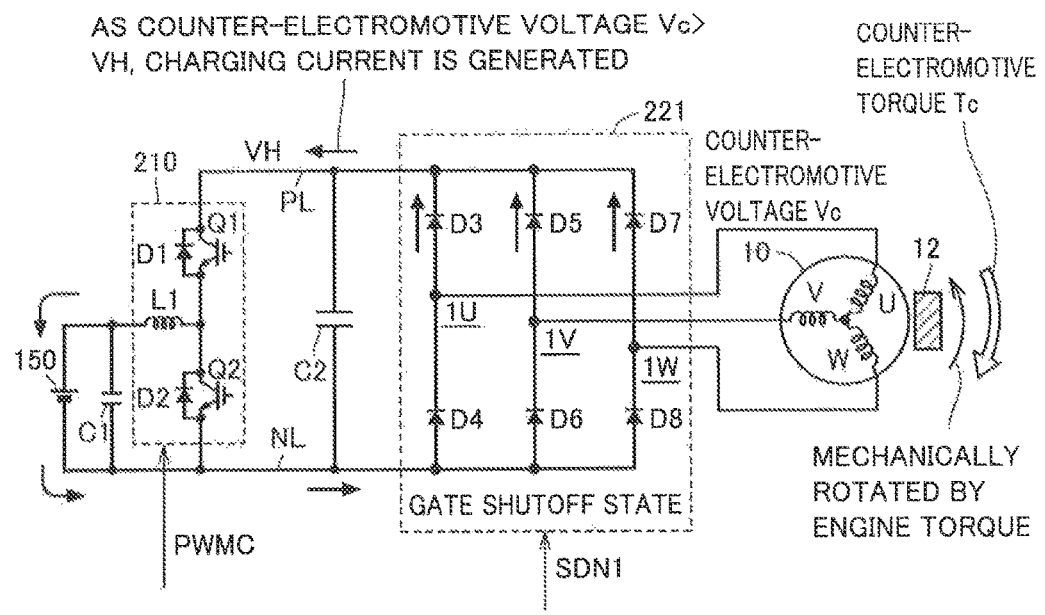
FIG. 3 is a diagram schematically illustrating an operation state of the electrical system during inverter-less running.

FIG. 3 is a diagram schematically illustrating an operation state of the electrical system during the inverter-less running. During the inverter-less running, in response to gate shut-off signal SDN1 from ECU 300, all switching elements Q3 to Q8 included in inverter 221 are turned into the non-conductive state. Therefore, diodes D3 to D8 included in inverter 221 forms a three-phase full-wave rectifier circuit. Similarly, in response to gate-off signal SDN2 from ECU 300, all switching elements Q9 to Q14 (see FIG. 2) included in inverter 222 are turned into the non-conductive state. Therefore, diodes D9 to D14 included in inverter 222 forms a three-phase full-wave rectifier circuit. On the other hand, switching elements Q1 and Q2 included in converter 210 continue to perform the switching operation in response to control signal PWMC from ECU 300.

Since engine 100 is driven during the inverter-less running, engine 100 outputs engine torque Te, and motor generator 10 is dynamically (mechanically) rotated by this engine torque Te. Since motor generator 10 is a synchronous motor, the rotor of motor generator 10 is provided with permanent magnets 12. Thus, permanent magnets 12 provided in the rotor of motor generator 10 are rotated by engine torque Te, and thereby a counter-electromotive voltage Vc is generated. When counter-electromotive voltage Vc exceeds system voltage VH, a current will flow from motor generator 10 to battery 150, and thereby, a counter-electromotive torque Tc will be generated in motor generator 10, acting to inhibit the rotation of motor generator 10.

Figure 4:
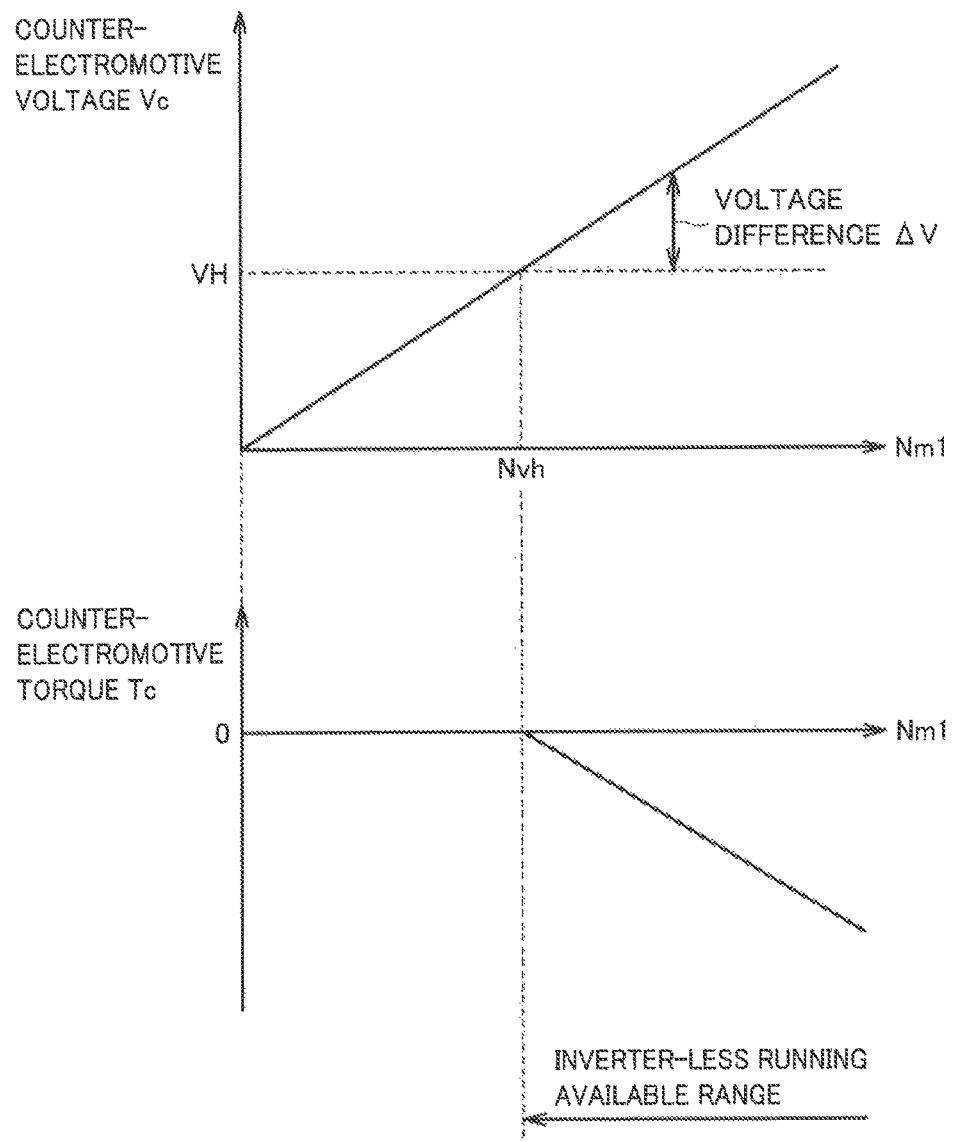
FIG. 4 is a diagram schematically illustrating the relationship between a MG1 rotation speed Nm1 and a counter-electromotive voltage Vc and the relationship between a MG1 rotation speed Nm1 and a counter-electromotive torque Tc.

FIG. 4 is a diagram schematically illustrating the relationship between MG1 rotation speed Nm1 and counter-electromotive voltage Vc and the relationship between MG1 rotation speed Nm1 and counter-electromotive torque Tc. In FIG. 4, the horizontal axis represents MG1 rotation speed Nm1, the vertical axis in the upper diagram represents counter-electromotive voltage Vc, and the vertical axis in the lower diagram represents counter-electromotive torque Tc.

In the rotation speed range illustrated in FIG. 4, counter-electromotive voltage Vc increases in value as MG1 rotation speed Nm1 becomes higher. In a range where MG1 rotation speed Nm1 is lower than a predetermined value Nvh, since counter-electromotive voltage Vc is less than system voltage VH, no current will be generated to flow from motor generator 10 to battery 150. Therefore, no counter-electromotive torque Tc will be generated.

In a range where MG1 rotation speed Nm1 exceeds predetermined value Nvh, since counter-electromotive voltage Vc is greater than system voltage VH, a current will be generated in response to the difference between counter-electromotive voltage Vc and system voltage VH (hereinafter referred to as "voltage difference $\Delta V$"), flowing in the direction from motor generator 10 to battery 150. In other words, motor generator 10 generates a counter-electromotive power, and battery 150 is charged by the counter-electromotive power. At this time, counter-electromotive torque Tc is produced according to the voltage difference $\Delta V$ in motor generator 10. Counter-electromotive torque Tc is a braking torque (negative torque) which acts to inhibit the rotation of motor generator 10. The range where counter-electromotive torque Tc is generated (i.e., where counter-electromotive voltage Vc exceeds system voltage VH) is a region where the inverter-less running is allowed.

Figure 5:
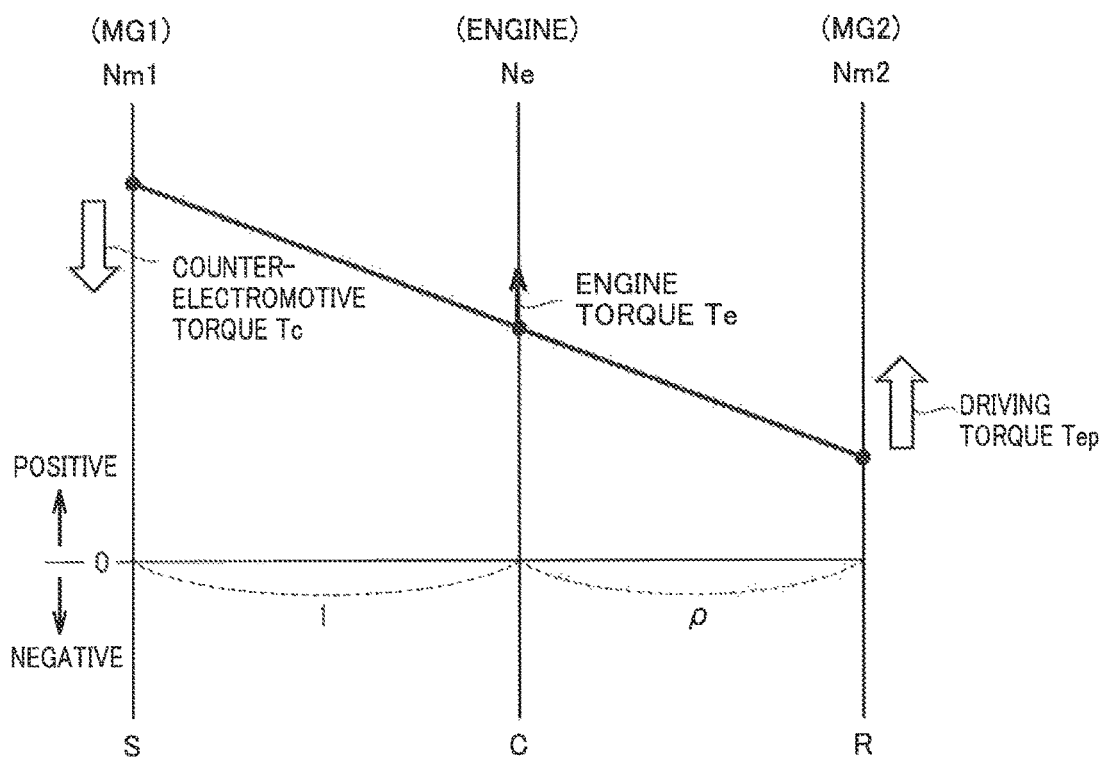
FIG. 5 is a diagram illustrating an example of a control state during the inverter-less running in a nomographic chart of a planetary gear mechanism.

FIG. 5 is a diagram illustrating an example of a control state between engine 100 and motor generators 10 and 20 during the inverter-less running in a nomographic chart of planetary gear mechanism 30. In planetary gear mechanism 30 configured as described with reference to FIG. 1, the rotation speed of sun gear S (which is equal to MG1 rotation speed Nm1), the rotation speed of carrier CA (which is equal to engine speed Ne) and the rotation speed of ring gear R (which is equal to MG2 rotation speed Nm2) have a linear relationship in the nomographic chart (hereinafter also referred to as "nomographic relationship").

During the inverter-less running, engine torque Te is output from engine 100. When motor generator 10 is mechanically rotated by engine torque Te, it produces counter-electromotive voltage Vc. As counter-electromotive voltage Vc exceeds system voltage VH, motor generator 10 generates counter-electromotive torque Tc acting in a direction (negative direction) that inhibits the rotation of motor generator 10.

As counter-electromotive torque Tc is applied from motor generator 10 to sun gear 5, a driving torque Tep is generated in ring gear R as a reaction force of counter-electromotive torque Tc, acting in a positive direction. Thus, Vehicle 1 is driven by driving torque Tep to perform the fail-safe running.

Meanwhile, motor generator 20 is also rotated by driving torque Tep, and thereby a counter-electromotive voltage will be generated in motor generator 20. However, as illustrated in the example of FIG. 5, since MG2 rotation speed Nm2 is lower than the rotation speed at which the counter-electromotive voltage generated by motor generator 20 does not exceed system voltage VH, no counter-electromotive torque will be generated in motor generator 20.

<Suppression of Battery Deterioration During Inverter-Less Running Control>

As vehicle 1 having the abovementioned configuration performs the inverter-less running, it is concerned that battery 150 may be deteriorated due to continuous charging. In other words, during the inverter-less running control, battery 150 is continuously charged by the counter-electromotive power generated by motor generator 10. When battery 150 is continuously charged by a large battery charging current IB, the concentration of lithium ions in the electrolyte of battery 150 changes unevenly, which may result in an irreversible deterioration of battery 150 (the so-called high-rate deterioration).

Therefore, ECU 300 according to the present embodiment is configured to calculate an integrated current value ∫(IB)dt by integrating battery charging current IB over a charging time t of battery 150, and reduce engine rotation speed Ne when integrated current value ∫(IB)dt is greater than a predetermined value such that engine rotation speed Ne is smaller than that when integrated current value ∫(IB)dt is equal to or smaller than the predetermined value. Since engine rotation speed Ne is reduced, MG1 rotation speed Nm1 decreases accordingly, and thereby, the counter-electromotive power generated by motor generator 10, namely the electrical power for charging battery 150 is reduced. As a result, it is possible to suppress the battery deterioration during the inverter-less running control.

Figure 6:
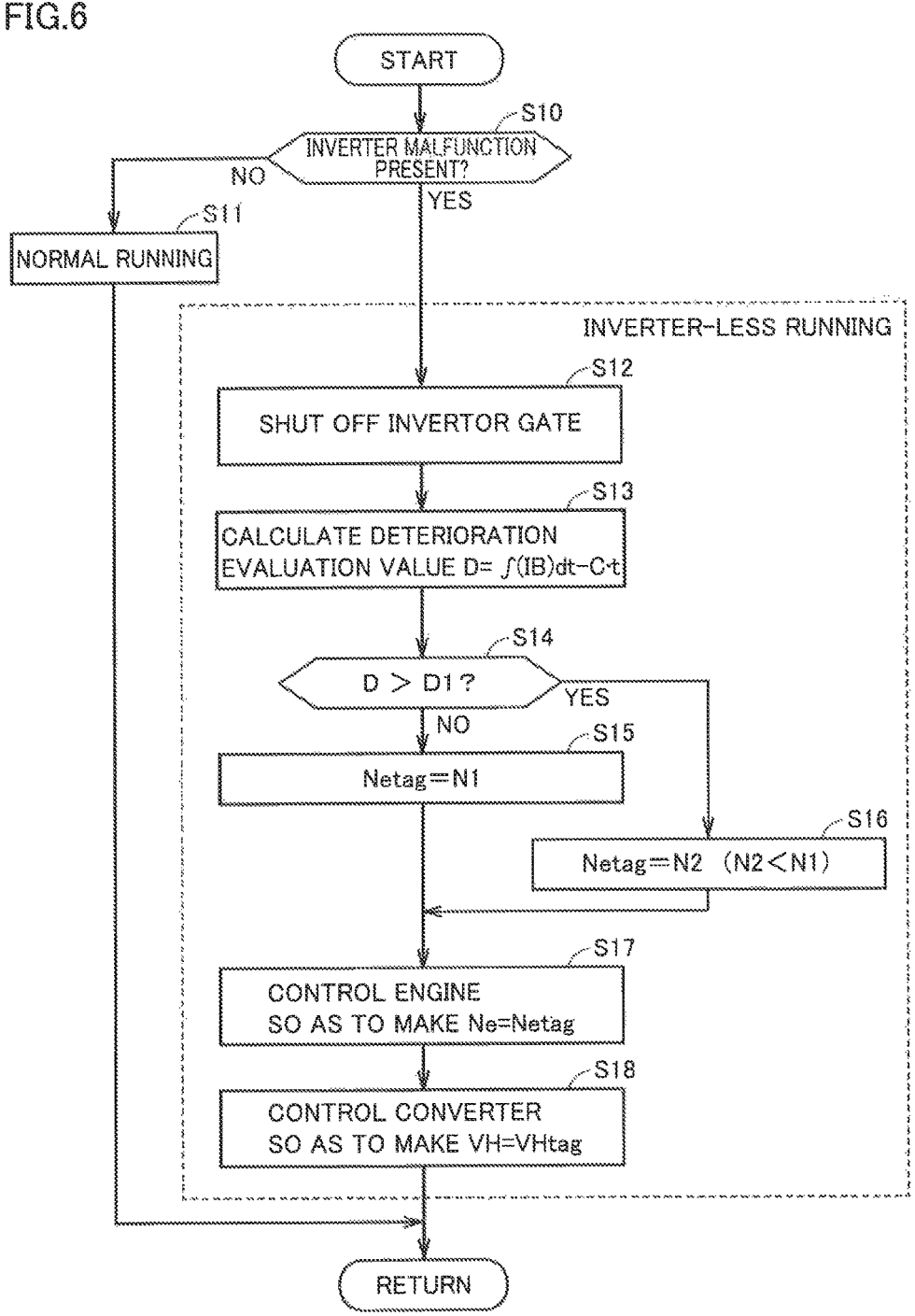
FIG. 6 is a flowchart illustrating an example of a processing procedure performed by the ECU.

FIG. 6 is a flowchart illustrating a processing procedure performed by ECU 300. This processing procedure is performed repeatedly at a predetermined cycle.

At step (hereinafter, the word "step" will be abbreviated as "S") 10, ECU 300 determines whether the abovementioned inverter malfunction is present or not.

In the case where the inverter malfunction is not present NO at S10), ECU 300 sets the control mode to the normal mode so as to perform the normal running at S11.

In the case where the inverter malfunction is present (YES at S10), ECU 300 sets the control mode to the fail-safe mode so as to perform the inverter-less running from S12 to S18.

Specifically, ECU 300 switches inverters 221 and 222 into the gate shut-off state at S12. Thereafter, at S13, ECU 300 calculates a value D (hereinafter also referred to as "deterioration evaluation value") that indicates the progress of deterioration of battery 150 caused by the continuous charging. For example, ECU 300 calculates deterioration evaluation value D by using the following equation (1).

$$D = \int (IB)dt - C \cdot t \quad (1)$$

In the equation (1), "t" denotes the charging time of battery 150 as described above, "∫(IB)dt" denotes the integrated current value as described above (which is calculated by integrating batter charging current IB over charging time t battery 150). Integrated current value ∫(IB)dt corresponds to the progressing degree of uneven changes on the lithium ion concentration in the electrolyte of battery 150 in response to the continuous charging. "C" is a factor (hereinafter referred to as "mitigation factor") representing the mitigating degree of uneven changes of lithium ion concentration in the electrolyte mitigated per unit time due to the diffusion of lithium ions. Thus, "C·t" corresponds to the mitigating degree of uneven changes of lithium ion concentration in the electrolyte mitigated over charging time t.

At S14, ECU 300 determines whether or not deterioration evaluation value D is greater than a threshold value D1. Threshold value D1 is set in such a manner that the possibility for the high-rate deterioration to occur is high.

In the case where deterioration evaluation value D is equal to or smaller than threshold value D1 (NO at S14), ECU 300 sets engine target rotation speed Netag to a predetermined rotation speed N1. In the case where deterioration evaluation value D is greater than threshold value D1 (YES at S14), ECU 300 sets engine target rotation speed Netag to a predetermined rotation speed N2 which is smaller than predetermined rotation speed N1.

Figure 7:
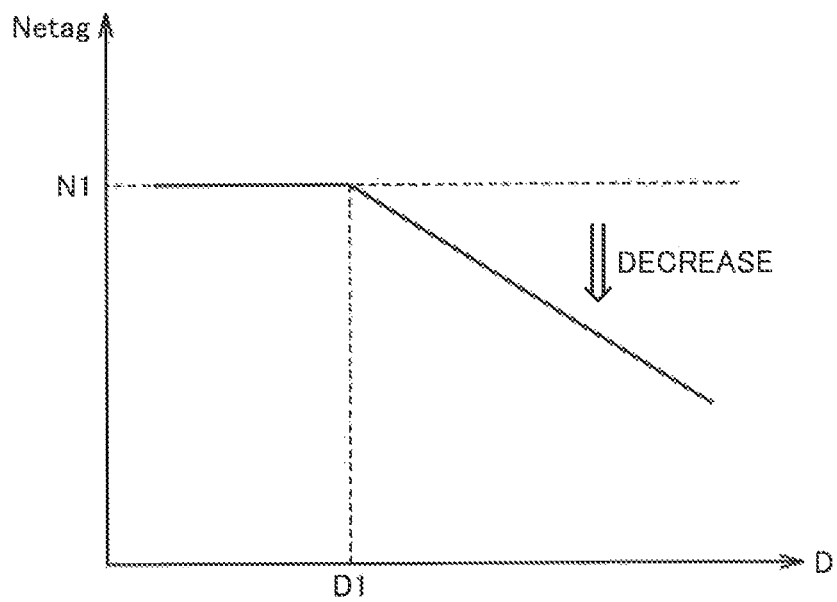
FIG. 7 is a diagram illustrating the relationship between a deterioration evaluation value D and an engine target rotation speed Netag.

FIG. 7 is a diagram illustrating the relationship between deterioration evaluation value D and engine target rotation speed Netag. As illustrated in FIG. 7, when deterioration evaluation value D (=∫(IB)dt−C·t) is equal to or smaller than threshold value D1, i.e., the integrated current value ∫(IB)dt is equal to or smaller than the predetermined value (=D1+C·t), it is considered that the high-rate deterioration is less likely to occur, and thus, engine target rotation speed Netag is set to predetermined rotation speed N1.

On the other hand, when deterioration evaluation value D is greater than threshold value D1, i.e., the integrated current value ∫(IB)dt is greater than the predetermined value (=D1+C·t), it is considered that the high-rate deterioration is likely to occur, and thus, engine target rotation speed Netag is set to a value smaller than predetermined rotation speed N1.

Furthermore, in the present embodiment, in a range where deterioration evaluation value D is larger than threshold value D1, the larger deterioration evaluation value D is, the smaller engine target rotation speed Netag will be set to. For example, ECU 300 may store in advance the relationship illustrated in FIG. 7 as a map, and calculate engine target rotation speed Netag corresponding to the actual deterioration evaluation value D with reference to this map.

Returning back to FIG. 6, at S17, ECU 300 controls engine 100 so as to make engine rotation speed Ne equal to engine target rotation speed Netag which is calculated at S15 or S16.

At S18, ECU 300 controls converter 210 so as to make system voltage VH equal to system target voltage VHtag. In the present embodiment, system target voltage VHtag is preliminarily set to a constant value, in other words, system voltage VH is constant.

Thus, when deterioration evaluation value D is greater than threshold value D1, i.e., when the integrated current value ∫(IB)dt is greater than the predetermined value (=D1+C·t), while system voltage VH is being kept constant, engine rotation speed Ne is reduced and MG1 rotation speed Nm1 is reduced according to the relationship in the nomographic chart, and thereby, counter-electromotive voltage Vc generated by motor generator 10 is reduced (see FIG. 4). Thus, it is possible to reduce the voltage difference ΔV (=Vc−VH) between counter-electromotive voltage Vc and system voltage VH, and thereby, the counter-electromotive power generated by the first rotating electric machine, namely the charging power of battery 150 is reduced. As a result, battery 150 is prevented from being charged at a large current (the high-rate charging), which makes it possible to suppress the high-rate deterioration of battery 150.

As described above, during the inverter-less running control, ECU 300 according to the present embodiment decreases engine rotation speed Ne when the integrated current value ∫(IB)dt is greater than a predetermined value (=D1+C·t) smaller than that when integrated current value ∫(IB)dt is equal to or smaller than the predetermined value (=D1+C·t). Since engine rotation speed Ne is reduced, MG1 rotation speed Nm1 decreases accordingly, and thereby, the counter-electromotive power generated by motor generator 10, namely the charging power for battery 150 is reduced. As a result, it is possible to suppress the deterioration of battery 150 during the inverter-less running control.

Furthermore, since the inverter-less running control can be continued while reducing the charging power for battery 150, it is possible to elongate the fail-safe running distance under the inverter-less running control.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:

an engine;

a first rotating electrical machine including a rotor provided with a permanent magnet;

an output shaft coupled to drive wheels;

a planetary gear device mechanically coupled to the engine, the first rotating electrical machine and the output shaft, and configured to transmit torque among the engine, the first rotating electrical machine and the output shaft;

a second rotating electrical machine coupled to the output shaft;

a battery;

an inverter configured to perform a power conversion between the battery and the first rotating electrical machine and between the battery and the second rotating electrical machine; and a controller configured to perform an inverter-less running control when at least one of the first rotating electrical machine and the second rotating electrical machine is not normally driven by the inverter, the inverter-less running control being such a control that the inverter is brought into a gate shut-off state, and the engine is driven to cause the first rotating electrical machine to generate a braking torque due to a counter-electromotive voltage generated by the first rotating electrical machine, and thereby the vehicle is caused to run with a torque which acts on the output shaft as a counter-force of the braking torque, and during the inverter-less running control, the controller being configured to:

(i) when an integrated value of battery charging current is equal to or less than a predetermined value, control a rotation speed of the engine to be a first engine rotation speed; and (ii) when the integrated value of battery charging current is greater than the predetermined value, control the rotation speed of the engine to be a second engine rotation speed which is smaller than the first engine rotation speed.

* * * * *